(12) United States Patent
Everly et al.

(10) Patent No.: US 11,047,281 B2
(45) Date of Patent: Jun. 29, 2021

(54) TEMPERATURE-BASED CONTROL OF REAGENT DISTRIBUTION

(71) Applicant: Watlow Electric Manufacturing Company, St. Louis, MO (US)

(72) Inventors: Mark Denis Everly, St. Charles, MO (US); Paul Douglas Free, Hope, IN (US); Jeffrey R. Diestelmeier, Roscoe, IL (US); Andrew D. Selvy, O'Fallon, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 152 days.

(21) Appl. No.: 16/009,968

(22) Filed: Jun. 15, 2018

(65) Prior Publication Data

US 2018/0363527 A1    Dec. 20, 2018

Related U.S. Application Data

(60) Provisional application No. 62/520,959, filed on Jun. 16, 2017.

(51) Int. Cl.
*F01N 3/20* (2006.01)
*F01N 3/08* (2006.01)
*F01N 11/00* (2006.01)

(52) U.S. Cl.
CPC ............ *F01N 3/208* (2013.01); *F01N 3/0842* (2013.01); *F01N 11/00* (2013.01);
(Continued)

(58) Field of Classification Search
CPC .. F01N 11/00; F01N 2240/02; F01N 2240/16; F01N 2240/25; F01N 2560/026;
(Continued)

(56) References Cited

U.S. PATENT DOCUMENTS

| | | |
|---|---|---|
| 5,281,403 A | 1/1994 | Jones |
| 8,220,274 B2 | 7/2012 | Bono et al. |

(Continued)

FOREIGN PATENT DOCUMENTS

| | | |
|---|---|---|
| CN | 102787889 | 11/2012 |
| CN | 102808687 | 12/2012 |

(Continued)

OTHER PUBLICATIONS

International Search Report for International Application PCT/US2018/037835, dated Sep. 27, 2018.
(Continued)

*Primary Examiner* — Anthony Ayala Delgado
(74) *Attorney, Agent, or Firm* — Burris Law, PLLC

(57) ABSTRACT

The present disclosure provides a method of treating a diesel exhaust system that includes heating a reagent to a temperature such that at least a portion of the reagent is heated to a gaseous phase, injecting the reagent into a diesel exhaust stream upstream of a catalyst, and reacting the diesel exhaust with the heated reagent over the catalyst to convert $NO_x$ into $N_2$ and $H_2O$. The heating modulates a mass flow rate of the reagent by converting a state of matter of the reagent at least (Continued)

partially to the gaseous phase prior to or after being injected, and the heated reagent in the gaseous form reduces deposit formations within the diesel exhaust system.

19 Claims, 1 Drawing Sheet

(52) U.S. Cl.
CPC ...... *F01N 2240/02* (2013.01); *F01N 2240/16* (2013.01); *F01N 2240/25* (2013.01); *F01N 2560/026* (2013.01); *F01N 2560/06* (2013.01); *F01N 2560/07* (2013.01); *F01N 2610/02* (2013.01); *F01N 2610/06* (2013.01); *F01N 2610/10* (2013.01); *F01N 2610/102* (2013.01); *F01N 2610/105* (2013.01); *F01N 2610/144* (2013.01); *F01N 2610/146* (2013.01); *F01N 2610/1453* (2013.01); *F01N 2900/0416* (2013.01); *F01N 2900/0602* (2013.01); *F01N 2900/08* (2013.01); *F01N 2900/12* (2013.01); *F01N 2900/1402* (2013.01); *F01N 2900/1404* (2013.01); *F01N 2900/1411* (2013.01); *F01N 2900/1602* (2013.01); *F01N 2900/1811* (2013.01); *F01N 2900/1812* (2013.01); *F01N 2900/1818* (2013.01)

(58) Field of Classification Search
CPC ............. F01N 2560/06; F01N 2560/07; F01N 2610/02; F01N 2610/06; F01N 2610/10; F01N 2610/102; F01N 2610/105; F01N 2610/144; F01N 2610/1453; F01N 2610/146; F01N 2900/0416; F01N 2900/0602; F01N 2900/08; F01N 2900/12; F01N 2900/1402; F01N 2900/1404; F01N 2900/1411; F01N 2900/1602; F01N 2900/1811; F01N 2900/1812; F01N 2900/1818; F01N 3/0842; F01N 3/208
See application file for complete search history.

(56) References Cited

U.S. PATENT DOCUMENTS

| | | | |
|---|---|---|---|
| 2004/0098972 A1* | 5/2004 | Upadhyay | B01D 53/9431 60/286 |
| 2007/0119153 A1* | 5/2007 | Pierz | F01N 3/2066 60/286 |
| 2008/0314027 A1 | 12/2008 | Barber et al. | |
| 2009/0313980 A1* | 12/2009 | Lawrence | F01N 11/00 60/303 |
| 2013/0186086 A1 | 7/2013 | Sarby | |
| 2015/0196878 A1* | 7/2015 | Nunez | F01N 3/208 423/212 |
| 2017/0037799 A1 | 2/2017 | Balenovic et al. | |
| 2017/0276050 A1* | 9/2017 | Stenfeldt | F01N 3/206 |
| 2018/0179938 A1* | 6/2018 | Shaull | F02M 61/162 |

FOREIGN PATENT DOCUMENTS

| | | |
|---|---|---|
| CN | 103511040 | 1/2014 |
| CN | 104053871 | 9/2014 |
| CN | 105422229 | 3/2016 |
| DE | 19810275 | 9/1999 |
| DE | 102005051899 | 5/2007 |
| DE | 102013107062 | 1/2014 |
| EP | 0894523 | 2/1999 |
| EP | 1106799 | 6/2001 |
| EP | 1854973 | 11/2007 |
| EP | 2826973 | 1/2015 |
| FR | 2973834 | 10/2012 |
| FR | 2990994 | 11/2013 |
| WO | 1997/036676 | 10/1997 |
| WO | 2013153298 | 10/2013 |
| WO | 2014070516 | 5/2014 |
| WO | 2017198292 | 11/2017 |

OTHER PUBLICATIONS

Office Action dated Apr. 6, 2021 issued in Chinese Application No. 201880039542.6 and it's English translation, 14 pages.

* cited by examiner

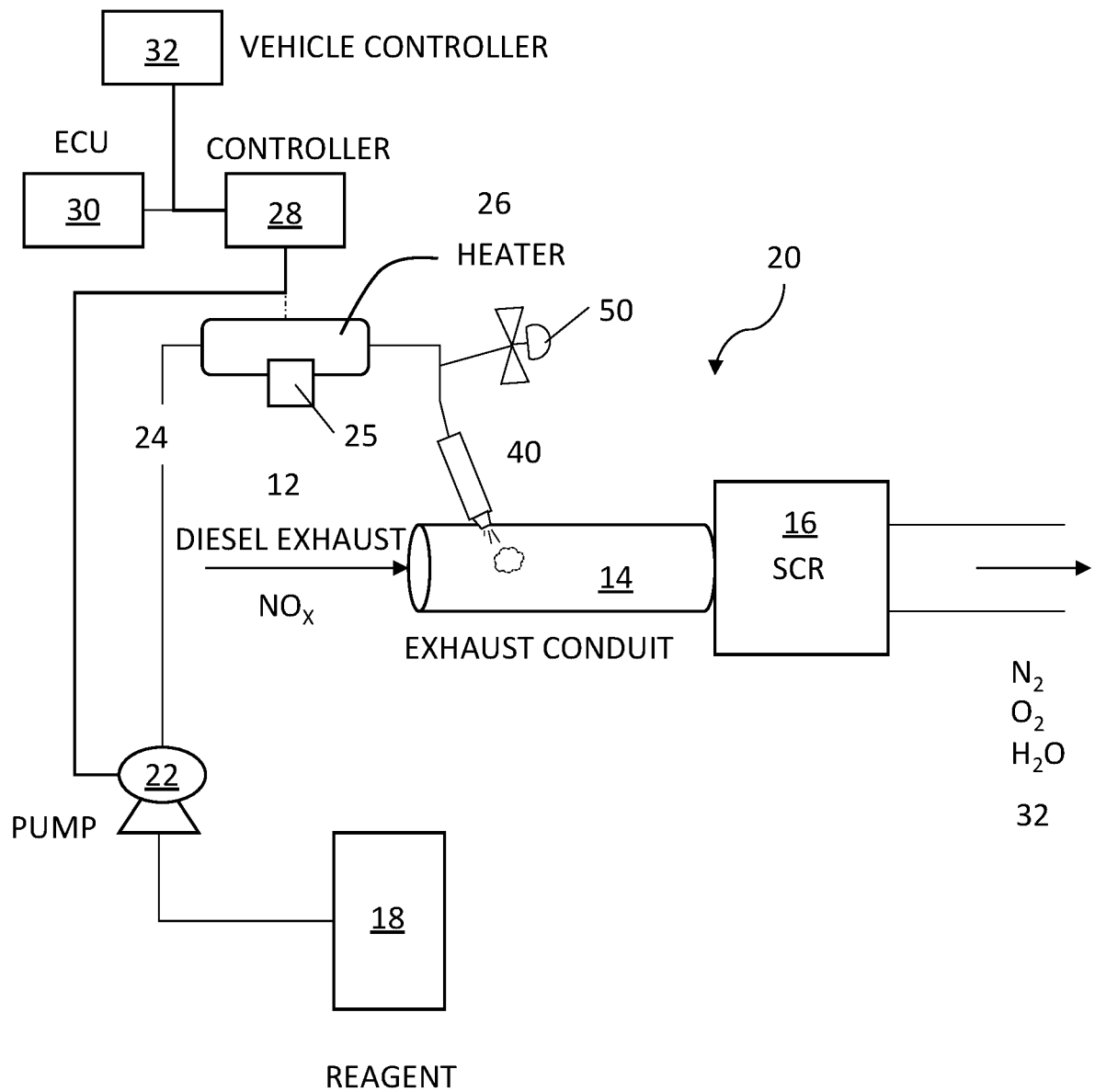

TEMPERATURE-BASED CONTROL OF REAGENT DISTRIBUTION

CROSS-REFERENCE TO RELATED APPLICATIONS

This application claims priority to and the benefit of U.S. Provisional Application Ser. No. 62/520,959, filed on Jun. 16, 2017. The disclosure of the above application is incorporated herein by reference in its entirety.

FIELD

The present disclosure relates to diesel engine exhaust after-treatment systems, and more particularly to systems for injecting urea upstream of a catalyst in a diesel exhaust stream to reduce harmful emissions.

BACKGROUND

The statements in this section merely provide background information related to the present the disclosure and may not constitute prior art.

Many diesel exhaust after-treatment systems use SCR (Selective Catalytic Reduction) to reduce NOx (oxides of Nitrogen) emissions. SCR systems use a catalyst to encourage the reaction of NOx with ammonia to produce $N_2$ and $H_2O$. Commonly, ammonia is supplied to the catalyst through the injection and subsequent decomposition of urea (in the form of an aqueous solution of urea in water) in the exhaust upstream of the catalyst. Since effectiveness of the system in removing NOx from the exhaust depends upon an appropriate distribution of ammonia in the catalyst, and since the distribution of ammonia is dependent upon the distribution of urea resulting from the injection process, control of the distribution of urea is a factor in improving the conversion efficiency of an SCR system.

In addition to their sensitivity to the distribution of ammonia in the catalyst, SCR systems are subject to problems with deposit formation associated with the injection of urea. Injected urea that impinges on surfaces that are insufficiently warm can form persistent deposits inside of the exhaust system that can lead to system ineffectiveness. To prevent these deposits, injection of urea is often limited to operating conditions where the exhaust stream is warm enough to prevent deposit formation. Injecting urea only when the exhaust stream is warm enough reduces the overall effectiveness of the system (since it effectively does not operate in some operating conditions). To mitigate the reduction in NOx conversion effectiveness, system designers use various methods to increase the temperature of the exhaust (usually at a cost to fuel economy) or to heat the exhaust structure around the site of injection. In addition, system designers must also take into consideration the amount of DEF (diesel exhaust fluid), i.e., urea that needs to be injected into the system at any given time. Under conditions that require higher amounts of DEF to be injected, such as those typically associated with higher levels of NOx, system designers employ various methods to reduce or minimize contact of the DEF spray plume with surfaces inside the exhaust system. This helps reduce deposit formation, such as pulsating the injection process or varying the injection pressure of the DEF. These methods are often marginally successful in preventing deposit formation.

SUMMARY

In one form of the present disclosure, a method of treating a diesel exhaust system is provided that includes heating a reagent to a temperature such that at least a portion of the reagent is heated to a gaseous phase, injecting the reagent into a diesel exhaust stream upstream of a catalyst, and reacting the diesel exhaust with the heated reagent over the catalyst to convert $NO_x$ into $N_2$ and $H_2O$. The heating step modulates a mass flow rate of the reagent by converting a state of matter of the reagent at least partially to the gaseous phase prior to or after being injected into the diesel exhaust stream, and the heated reagent in the gaseous form reduces deposit formations within the diesel exhaust system.

In another form, the heating is carried out by at least one of a heater, heat from a diesel engine, heat from engine coolant, and heat from the diesel exhaust stream. The heater may be selected from the group consisting of a two-wire heater, a tubular heater, a cartridge heater, and a layered heater.

In another form, the method includes controlling power to accomplish at least one of heating the reagent to a desired set point temperature and heating the reagent based on operational data.

When the reagent is heated to the desired set point temperature, the set point temperature is based on at least one of engine speed, engine load, fuel flow rate to an engine, exhaust gas temperature (EGT), exhaust flow rate, historical values of EGT and exhaust flow rate, catalyst temperature, reagent injection conduit temperature, reagent pressure, reagent mass flow rate, reagent quality, ambient air temperature, altitude, NOx sensor data, exhaust gas pressure, and an anticipated engine state from at least one of an engine control unit and a vehicle controller, and combinations thereof.

When the reagent is heated based on operational data, and the operational data is selected from the group consisting of temperature, engine speed, engine load, fuel flow rate to an engine, exhaust gas temperature (EGT), exhaust flow rate, catalyst temperature, reagent injection conduit temperature, reagent pressure, reagent mass flow rate, reagent quality, ambient air temperature, altitude, NOx sensor data, exhaust gas pressure, and combinations thereof.

In another form, controlling the power to the heater is carried out by a controller that is in communication with at least one of an engine control unit and a vehicle controller and the temperature of the reagent is controlled as a function of at least one of engine parameters controlled by the engine control unit and vehicle parameters controlled by the vehicle controller.

In a further form, the mass flow rate of the reagent is modulated by at least one nozzle disposed upstream of the catalyst.

In a further form, the at least one nozzle comprises at least one orifice that is sized to accommodate modulation of the mass flow rate of the reagent by converting a portion of the reagent flow to a gaseous state or by changing the properties of the reagent flowing through the nozzle, wherein modulating the mass flow rate of the reagent is a function of at least one of engine or vehicle parameters.

In various forms of the nozzle, the nozzle may include a first stage nozzle for a low mass flow rate of the reagent and a second stage nozzle for higher mass flow rates of the reagent, and/or a plurality of injection nozzles arranged in a concentric pattern. The orifice of the nozzle may be selected from the group consisting of an annular orifice and a critical flow orifice to create a choked flow of the reagent. The nozzle may include an adjustable orifice size.

In yet another form, the method further includes controlling the mass flow rate of the reagent using a pump connected to a reagent source.

In another form, a method of treating a diesel exhaust system is provided by the present disclosure that includes heating a reagent to a temperature such that at least a portion of the reagent is heated to a gaseous phase, injecting the reagent into a diesel exhaust stream upstream of a catalyst, and reacting the diesel exhaust with the heated reagent over the catalyst to convert $NO_x$ into $N_2$ and $H_2O$. The heating modulates a mass flow rate of the reagent by converting a state of matter of the reagent at least partially to the gaseous phase prior to being injected.

In one form, the method further includes adjusting at least one of a mass flow rate of the reagent and power provided to the heater based on at least one of temperature data and operational data.

In yet another form, a method of treating a diesel exhaust system is provide by the present disclosure that includes heating a reagent to a temperature such that at least a portion of the reagent is heated to a gaseous phase, injecting the reagent into a diesel exhaust stream upstream of a catalyst, and reacting the diesel exhaust with the heated reagent over the catalyst to convert $NO_x$ into $N_2$ and $H_2O$. The heating modulates a mass flow rate of the reagent by converting a state of matter of the reagent at least partially to the gaseous phase, and the heated reagent in the gaseous form reduces deposit formations within the diesel exhaust system.

In one form, the method further includes adjusting at least one of a mass flow rate of the reagent and power provided to the heater based on at least one of temperature data and operational data.

A diesel-powered apparatus operated according to at least one of the various methods of the present disclosure is also provided.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The accompanying drawing, incorporated in and forming a part of the specification, illustrate several aspects of the present disclosure and, together with the description, serve to explain the principles of the disclosure. The components in the figures are not necessarily to scale. In the drawing:

FIG. 1 is schematic view of a diesel exhaust after-treatment system according to the teachings of the present disclosure and having a heater operatively connected to a reagent source.

DETAILED DESCRIPTION

The following description is merely exemplary in nature and is in no way intended to limit the present disclosure, its application, or uses. It should also be understood that steps within a method may be executed in different order without altering the principles of the present disclosure.

Referring to FIG. 1, a diesel exhaust after-treatment system according to the teachings of the present disclosure is illustrated and generally indicated by reference numeral 20. The diesel exhaust after-treatment system 20 comprises a fluid injection conduit 24 coupled to a source of reagent 18 and to a diesel exhaust stream 12, upstream of a catalyst 16 (which in this form is selective catalytic reduction (SCR)). The system 20 also includes a heater 26 operatively connected to the injection conduit 24, wherein in one form, the heater 26 heats the reagent flowing through the injection conduit 24 to convert a state of matter of the reagent at least partially to a gaseous state prior to being injected into the diesel exhaust stream. As used herein, the term "reagent" should be construed to mean any substance/material that can be combined with the catalyst 16 to result in a chemical reaction that reduces the amount of NOx within the diesel exhaust stream 12. For example, such materials may include any diesel exhaust fluid (DEF), or an aqueous urea solution, that is used in the catalyst 16 in order reduce NOx.

The heater 26 may be any type of heater construction, including but not limited to a tubular heater, a cartridge heater, or a layered heater, among others. Further, the heater 26 may be self-regulating, among other forms as described herein.

As further shown, the diesel exhaust after-treatment system 20 further comprises a controller 28 in communication with the heater 26, wherein the controller 28 is operable to adjust power to the heater 26 to heat the reagent to a desired set point temperature. The set point temperature is based on at least one of engine speed, engine load, fuel flow rate to an engine, exhaust gas temperature (EGT), exhaust flow rate, historical values of EGT and exhaust flow rate, catalyst temperature, reagent injection conduit temperature, reagent pressure, reagent mass flow rate, reagent quality, ambient air temperature, altitude, NOx sensor data, exhaust gas pressure, and an anticipated engine state from at least one of an engine control unit and a vehicle controller, and combinations thereof.

The diesel exhaust after-treatment system 20 also includes a pump 22 connected to the reagent source 18, wherein the controller 28 is in communication with the pump 22 to control a mass flow rate of the reagent.

At least one temperature sensor 25 may be disposed proximate the heater 26 to sense a temperature of the reagent. Alternately, the heater 26 may be a "two-wire" heater, wherein the heater functions as both a heater and a temperature sensor, thus eliminating the need for a discrete temperature sensor. Such a two-wire heater is shown and described in U.S. Pat. No. 7,196,295, which is commonly owned with the present application and the contents of which are incorporated herein by reference in their entirety.

In one form, the controller 28 receives temperature data from the temperature sensor 25, (or a two-wire heater), and adjusts power to the heater 26 accordingly. Also, the controller 28 may receive temperature data from the temperature sensor 25 and adjust a mass flow rate of the reagent accordingly. In still another form at least one temperature sensor (not shown) is disposed upstream or downstream from the heater 26, wherein the controller 28 adjusts at least one of a mass flow rate of the reagent and power provided to the heater 26 based on temperature data received from the temperature sensor and the heater 26. The diesel exhaust after-treatment system 20 may also comprise another heater (not shown, within the exhaust conduit 14 or within the injection conduit 24), and the controller 28 adjusts at least one of a mass flow rate of the reagent and power provided to the heater 26 based on temperature data received from the two heaters.

The heater 26 may define at least two zones, and the controller 28 adjusts at least one of a mass flow rate of the reagent and power provided to the heater 26 based on temperature data received from the at least two heater zones. Such a zoned heater may include the configuration disclosed in U.S. Pat. No. 9,113,501, which is commonly owned with the present application and the contents of which are incorporated herein by reference in their entirety.

In still another form, a first temperature sensor is disposed downstream from the heater 26 and a second temperature sensor disposed upstream from the heater 26, wherein the controller 28 adjusts at least one of a mass flow rate of the reagent and power provided to the heater 26 based on temperature data received from the first and second temperature sensors.

The controller 28 in one form is in communication with at least one of an engine control unit 30 and a vehicle controller 32, and the temperature of the reagent is controlled as a function of engine or vehicle parameters controlled by the at least one of an engine control unit 30 and a vehicle controller, respectively.

As further shown, the diesel exhaust after-treatment system 20 further comprises at least one injection nozzle 40 for delivering the heated reagent to the diesel exhaust stream, upstream of the catalyst 16. The nozzle 40 may take on any form or combinations of forms, including a multi-stage nozzle having a first stage nozzle for a low mass flow rate of the reagent and a second stage nozzle for higher mass flow rates of the reagent. There may be a plurality of injection nozzles arranged in a concentric pattern in another form of the present disclosure.

Each nozzle has an orifice, and the orifice may be selected from the group consisting of an annular orifice and a critical flow orifice to create a choked flow of the reagent. Further, the nozzle comprises an adjustable orifice size.

Generally, the nozzle 40 comprises at least one orifice that is sized to accommodate modulation of the mass flow rate of the reagent by converting a portion of the reagent flow to a gaseous state or by changing the properties of the reagent flowing through the nozzle, wherein modulating the mass flow rate of the reagent is a function of at least one of engine or vehicle parameters.

The present disclosure also includes a diesel-powered apparatus having the diesel exhaust after-treatment system 20 as described herein, such as by way of example, a motor vehicle or a genset.

The controller 28 that is in communication with the heater 26 is also operable to adjust power to the heater to heat the reagent based on operational data. The operational data is selected from the group consisting of temperature, engine speed, engine load, fuel flow rate to an engine, exhaust gas temperature (EGT), exhaust flow rate, catalyst temperature, reagent injection conduit temperature, reagent pressure, reagent mass flow rate, reagent quality, ambient air temperature, altitude, NOx sensor data, exhaust gas pressure, and combinations thereof.

In other forms, the control 28 can use temperature inputs from either the discrete sensors or the heater as a two-wire heater for a variety of control and diagnostic functions. For example, temperature data may be used to compare with a system model or set point(s) to validate that an expected mass flow rate is actually present. Diagnostics may include detection of a lack of flow (higher rate of rise) or that the controller 28 may be inoperative, the heater 26 may be degrading, or a sensor is inoperative (e.g., difference in temperature does not correspond with a system model).

The controller 28 may also be configured to provide "cascade control," or using two controllers and relating sensors, whether the sensors are discrete and/or two-wire with the heater 26.

Further, temperature data may be used to provide a high limit set point functionality to inhibit damaging/failure of the heater 26 in an abnormal condition.

It should be understood that the present disclosure also includes a form wherein the heater 26 heats the reagent flowing through the injection conduit 24 to convert a state of matter of the reagent at least partially to a gaseous state after being injected into the diesel exhaust stream 12. In another form, the heater 26 heats the reagent flowing through the injection conduit state and is operable to modulate a mass flow rate of the reagent by converting a state of matter of the reagent at least partially to a gaseous phase. This conversion may take place prior to or after being injected into the diesel exhaust stream 12. The heat source may be at least one of the heater 26, heat from the diesel engine, and heat from engine coolant.

In still another form, proportional valves 50 are operatively connected to heated and/or unheated reagent streams that mix heated and un-heated reagent flows to achieve a desired proportion of a gaseous state or steam quality vs gaseous state of the reagent.

Further still, in another form, the exhaust conduit 14 is coated with a material that is a hydrolysis catalyst. Such a material, such as by way of example $TiO_2$, is a hydrophobic material and thus would repel aqueous solutions, namely, the reagent. Coating the exhaust conduit 14, in addition to the conversion of a state of matter of the reagent at least partially to a gaseous state according to the teachings herein, further inhibits the formation of deposits within the exhaust conduit 14.

A method of reducing $NO_x$ from a diesel exhaust system is also provided, the method comprising the steps of:

heating a reagent to a temperature such that at least a portion of the reagent is heated to a gaseous phase;

injecting the reagent into a diesel exhaust stream upstream of a catalyst; and reacting the diesel exhaust with the heated reagent over the catalyst to convert $NO_x$ into $N_2$ and $H_2O$, wherein the heating modulates a mass flow rate of the reagent by converting a state of matter of the reagent at least partially to the gaseous phase, and the heated reagent in the gaseous form reduces deposit formations within the diesel exhaust system.

The present disclosure can optionally use heat from the exhaust stream (such as heat from downstream of the catalyst) to serve as a source of heat for the reagent (partially or totally replacing the electric heat). For systems without an electric heater, flow proportioning valves can be used to mix heated and un-heated flows to achieve a desired temperature or steam quality.

Addition of heat to the exhaust (especially through engine control) is used to hasten warm-up and to mitigate against low idle temperatures. The present disclosure is suitable to allow for reduced time to inject urea during start-up/warm-up conditions, including systems that include addition of heat to the exhaust, thus reducing NOx emissions during the warm-up time period. The tendency to add heat to the exhaust can be reduced thus improving engine efficiency and fuel economy, both during warm-up and during idle when exhaust gas temperatures would be undesirably low for an engine controlled for peak fuel (or fluid) economy.

The present disclosure provides a powerful new degree of freedom in managing reagent spray plume length. That is the ability to warm the reagent to reduce its evaporation time, which reduces the spray plume length. At light load and low engine speed, where excessive spray plume length is a problem for current systems, the present disclosure heats the reagent until it boils immediately after exiting the nozzle. This greatly reduces spray plume length and greatly enhances mixing.

In one form, the present disclosure provides for heating of the reagent prior to injection in an exhaust fluid flow system.

The exhaust fluid flow system can be part of a diesel engine system. Recognizing that the reagent upstream of an injection nozzle and downstream of a pump will be at an elevated pressure, heating the reagent to temperatures above a boiling point at the pressure that exists inside of the exhaust pipe is possible.

In one form, heated reagent may at least partially flash to steam upon injection affecting the size of the resulting droplets that form. For a given exhaust after-treatment system, the travel distance of the droplets from the nozzle tip depend upon their size and velocity in addition to the exhaust gas temperature and rate of flow. Since exhaust gas temperature and flow rates vary in the vast majority of applications (very few engines run at the same speed and load for their useful life), the travel distance of the droplets, and therefore the distribution of reagent in a catalyst, will vary with engine operating conditions.

By controlling temperature of the reagent (and/or the steam quality of the injected reagent) to compensate for changes in engine operating conditions, ammonia distribution in the catalyst can be improved and thus, improvement of system NOx conversion efficiency can be improved across a wide range of engine operating conditions. Since this method of control adds heat to the stream of reagent entering the exhaust gas stream, it is also possible to enable injection at lower exhaust gas temperatures without risking deposit formation. This increases the engine operating conditions for which reagent can be safely injected and thereby increase the overall conversion of NOx for the many diesel engines. It also allows for higher reagent injection rates while reducing reagent spray plume impingement on exhaust system surfaces, thus reducing the risk of deposit formation under higher NOx conditions.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of treating a diesel exhaust system, the method comprising:
   heating a liquid reagent to a temperature before introducing the reagent into any diesel exhaust stream of the diesel exhaust system, the temperature being at or above a boiling point of the reagent for a pressure inside of the diesel exhaust system;
   injecting the heated reagent into a diesel exhaust stream upstream of a catalyst, wherein the heated reagent is injected at a mass flow rate;
   adjusting the mass flow rate by changing a vapor quality of the heated reagent being injected; and
   reacting the diesel exhaust with the heated reagent over the catalyst to convert $NO_x$ into $N_2$ and $H_2O$,
   wherein the heating modulates the mass flow rate of the reagent by converting a state of matter of the reagent at least partially to a gaseous phase prior to or after being injected, and the heated reagent in the gaseous form reduces deposit formations within the diesel exhaust system.

2. The method of claim 1, wherein the heating is carried out by at least one of a heater, heat from a diesel engine, heat from engine coolant, and heat from the diesel exhaust stream.

3. The method of claim 2, wherein the heating is carried out by the heater, and the heater is selected from the group consisting of a two-wire heater, a tubular heater, a cartridge heater, and a layered heater.

4. The method of claim 1 further comprising controlling power to a heater to adjust the mass flow rate by changing the vapor quality of the heated reagent to a desired vapor quality based on operational data.

5. The method of claim 4, wherein the operational data is selected from the group consisting of temperature, engine speed, engine load, fuel flow rate to an engine, exhaust gas temperature (EGT), exhaust flow rate, catalyst temperature, reagent injection conduit temperature, reagent pressure, reagent mass flow rate, reagent quality, ambient air temperature, altitude, NOx sensor data, exhaust gas pressure, and combinations thereof.

6. The method of claim 4, wherein controlling the power to the heater is carried out by a controller that is in communication with at least one of an engine control unit and a vehicle controller and the vapor quality of the heated reagent is controlled as a function of at least one of engine parameters controlled by the engine control unit and vehicle parameters controlled by the vehicle controller.

7. The method of claim 1, wherein the mass flow rate of the heated reagent is modulated by at least one nozzle, the nozzle being upstream of the catalyst.

8. The method according to claim 7 further comprising a first stage nozzle for a low mass flow rate of the reagent and a second stage nozzle for higher mass flow rates of the reagent.

9. The method according to claim 7 further comprising a plurality of injection nozzles arranged in a concentric pattern.

10. The method of claim 7, wherein the at least one nozzle comprises at least one orifice that is sized to accommodate modulation of the mass flow rate of the reagent by converting a portion of the reagent flow to a gaseous state or by changing the properties of the reagent flowing through the nozzle, wherein modulating the mass flow rate of the reagent is a function of at least one of engine or vehicle parameters.

11. The method according to claim 7, wherein the nozzle comprises an orifice selected from the group consisting of an annular orifice and a critical flow orifice to create a choked flow of the reagent.

12. The method according to claim 7, wherein the nozzle comprises an adjustable orifice size.

13. The method of claim 1 further comprising controlling the mass flow rate of the reagent using a pump connected to a reagent source.

14. A diesel-powered apparatus operated according to the method of claim 1.

15. A method of treating a diesel exhaust system, the method comprising:
   heating a liquid reagent to a temperature that is at or above a boiling point of the reagent for a pressure inside of the diesel exhaust system;
   injecting the heated reagent into a diesel exhaust stream upstream of a catalyst, wherein the heated reagent is injected at a mass flow rate;
   adjusting the mass flow rate by changing a vapor quality of the heated reagent; and
   reacting the diesel exhaust with the heated reagent over the catalyst to convert $NO_x$ into $N_2$ and $H_2O$,
   wherein the heating modulates the mass flow rate of the reagent by converting a state of matter of the reagent at least partially to a gaseous phase prior to being injected into any diesel exhaust stream of the diesel exhaust system.

16. The method of claim 15, wherein changing the vapor quality of the heated reagent comprises adjusting power provided to a heater based on at least one of temperature data and operational data.

17. A method of treating a diesel exhaust system, the method comprising:
heating a first flow of a liquid reagent to a first temperature;
mixing the heated first flow of the reagent with a second flow the reagent to produce a mixed flow of the reagent at a third temperature, the second flow being of a second temperature that is lower than the first temperature;
injecting the mixed flow of the reagent into a diesel exhaust stream upstream of a catalyst; and
reacting the diesel exhaust with the heated reagent over the catalyst to convert $NO_x$ into $N_2$ and $H_2O$,
wherein the heating modulates a mass flow rate of the reagent by converting a state of matter of the reagent at least partially to the gaseous phase, and the heated reagent in the gaseous form reduces deposit formations within the diesel exhaust system.

18. The method of claim 17 further comprising adjusting at least one of a mass flow rate of the reagent and power provided to a heater based on at least one of temperature data and operational data.

19. The method of claim 17, wherein converting the state of matter of the reagent occurs prior to or after the reagent is injected into the diesel exhaust stream.

* * * * *